United States Patent
Rae et al.

(10) Patent No.: US 7,156,178 B2
(45) Date of Patent: Jan. 2, 2007

(54) COMPOSITIONS CONTAINING A BUFFER AND A PEROXIDE OR PERACID USEFUL FOR TREATING WELLS

(75) Inventors: Phillip J. Rae, Singapore (SG); Gino F. Dilullo Arias, Rio de Janeiro (BR)

(73) Assignee: BJ Services Company, Houston, TX (US)

(*) Notice: Subject to any disclaimer, the term of this patent is extended or adjusted under 35 U.S.C. 154(b) by 235 days.

(21) Appl. No.: 10/605,337

(22) Filed: Sep. 23, 2003

(65) Prior Publication Data

US 2004/0200619 A1   Oct. 14, 2004

Related U.S. Application Data

(60) Provisional application No. 60/413,181, filed on Sep. 24, 2002.

(51) Int. Cl.
*E21B 43/25* (2006.01)

(52) U.S. Cl. ............... 166/307; 166/279; 166/300; 166/312

(58) Field of Classification Search ............... None
See application file for complete search history.

(56) References Cited

U.S. PATENT DOCUMENTS

| | | | | |
|---|---|---|---|---|
| 4,464,268 A | | 8/1984 | Schievelbein | 252/8.55 B |
| 4,588,506 A | | 5/1986 | Raymond et al. | 210/606 |
| 4,591,443 A | | 5/1986 | Brown et al. | 210/747 |
| 4,934,457 A | | 6/1990 | Wallender | 166/304 |
| 5,038,864 A | | 8/1991 | Dunleavy et al. | 166/300 |
| 5,069,286 A | * | 12/1991 | Roensch et al. | 166/312 |
| 6,096,348 A | | 8/2000 | Miner et al. | 424/616 |
| 6,818,594 B1 | * | 11/2004 | Freeman et al. | 507/101 |

FOREIGN PATENT DOCUMENTS

| | | |
|---|---|---|
| EP | 0 601 792 A1 | 2/1993 |
| EP | 0579466 A3 | 1/1994 |
| WO | WO 85/04213 | 9/1985 |
| WO | WO 01/02698 A1 | 1/2001 |

OTHER PUBLICATIONS

Search Report under Section 17; Jan. 13, 2004.
British Examination Report dated Jun. 6, 2005 for Application No. GB0322359.1.

* cited by examiner

*Primary Examiner*—Zakiya W. Bates
(74) *Attorney, Agent, or Firm*—Howrey LLP

(57) ABSTRACT

Compositions containing a peroxide or peracid and an organic acid salt buffer are provided. Also provided is a method for utilizing such compositions for removing polymers from oil and gas wells, while simultaneously dissolving encountered calcium carbonate deposits.

16 Claims, No Drawings

COMPOSITIONS CONTAINING A BUFFER AND A PEROXIDE OR PERACID USEFUL FOR TREATING WELLS

CROSS REFERENCE TO RELATED APPLICATIONS

The present application claims the benefit of U.S. Provisional Patent Application Ser. No. 60/413,181 filed Sep. 24, 2002, the contents of which are incorporated herein by reference.

BACKGROUND OF INVENTION

1. Field of the Invention

A family of mud removal systems for the simultaneous removal of all polymer-based drilling fluid damage is disclosed. The damage can include that caused by partially-hydrolyzed polyacrylamide (PHPA) polymer and particulates such as calcium carbonate. The systems are based on the synergistic combination of organic salt buffers and either peroxides or per-acids. The systems can also include catalase enzymes.

2. Description of Related Art

Many wells are damaged in the course of drilling and workover by the use of drilling muds, drill-in fluids, kill fluids and kill-pills that contain, amongst other things, polymeric constituents. The latter may consist of a single polymer or may consist of mixtures of polymers in aqueous solution/suspension. These polymers may be added for the purposes of viscosification, leak-off control, lubrication, friction reduction and control of shales or other active clays. Typically, the polymers used for such purposes include xanthans (exo-polymers produced by *Xanthomonas Camperstris* and its relatives), starches (produced from corn, potato, etc), celluloses, guars, and derivatives of these main groups. Polyacrylamides may also be used, in particular so-called partially-hydrolyzed polyacrylamide (PHPA), which is used for shale encapsulation. In addition, most of these fluids contain some form of particulate to impart density and to improve fluid-loss control. The most common of these particulates is calcium carbonate although, occasionally, salt or barite may be used.

Subsequent well productivity can be significantly impaired by the use of these mixtures of polymers and particulate materials, due to the persistence of residues in the well. Their removal can result in substantial improvements in production. Historically, removal of these materials has involved the use of soaking with strong mineral acids (e.g. hydrochloric acid), strong organic acids (e.g. sulphamic acid), or oxidizing agents (e.g. sodium hypochlorite or lithium hypochlorite). More recently, enzymes have been used to remove the polymeric constituents. Some polymers, however, are largely immune to enzymatic degradation (e.g. PHPA).

Acids can hydrolyze some polymers, and can dissolve calcium carbonate. However, in practice, calcium carbonate is often coated with polymer residue, and its removal has been shown to be non-uniform, possible due to worm-holing of the acid through the cake. This results in non-optimal inflow performance, with higher drawdowns and, potentially, greater risk of early water breakthrough, fines migration, and formation failure. Additionally, the acid is corrosive and inefficient, and large volumes must be used in extended reach wells. While hypochlorites can destroy most polymers, they will not dissolve calcium carbonate and their high pH can cause problems if the formation contains any sensitive clays. Combining acids and hypochlorites generates chlorine gas, a potentially harmful material. Accordingly, prior treatments designed to target both polymers and calcium carbonate consisted of several steps. This complicates the operation, and causes additional expense due to the time involved.

Thus, there exists a need for clean-up compositions and methods that are effective at removing both polymer deposits and calcium carbonate. The methods preferably accomplish the removal of both materials in a single step.

SUMMARY OF INVENTION

Compositions comprising buffered hydrogen peroxide or per-acids are attractive for use in treating oil and/or gas wells that contain polymer deposits or calcium carbonate. An example per-acid is peroxyacetic acid. The compositions can further comprise enzymes such as peroxidases. Methods for treating wells can be performed as single step treatments.

DETAILED DESCRIPTION

Compositions and methods have been identified that are capable of removing all polymers encountered thus far while, simultaneously, dissolving calcium carbonate. The treatment methods include a single step treatment of a well, effective at reducing or eliminating the presence of polymer deposits and calcium carbonate. The methods improve the permeability of the well, preferably to at least the level observed prior to formation of polymer deposits.

Compositions

One embodiment of the invention relates to well treatment compositions. The compositions can comprise, consist essentially of, or consist of water, a buffer, and hydrogen peroxide and/or a per-acid. The composition can further comprise iron-control agents, surface tension reducers, dispersants, corrosion inhibitors, clay stabilizers, and other components useful in treating wells.

The water can generally be from any source. The water can be fresh water, brackish water, or salt water. The compositions can generally have any pH. For example, the pH can be about 1, about 2, about 3, about 4, about 5, about 6, about 7, about 8, or ranges between any two of these values. It is presently preferred that the pH be about 3.0 to about 5.0.

The buffer can generally be any buffer system. Buffers commonly are a combination of an acid and its salt. For example, a buffer can comprise acetic acid and an acetate salt (such as sodium acetate, potassium acetate, or ammonium acetate), formic acid and a formate salt (such as sodium formate, potassium formate, or ammonium formate), citric acid and a citrate salt (such as sodium citrate, potassium citrate, or ammonium citrate), and other acid/salt buffer combinations. The buffer system can generally be present at any concentration. The buffer system can be present at a concentration of about 1 weight percent to about 30 weight percent. Example concentrations include about 1 weight percent, about 5 weight percent, about 10 weight percent, about 15 weight percent, about 20 weight percent, about 25 weight percent, about 30 weight percent, and ranges between any two of these values.

Hydrogen peroxide can generally be present in the composition at a concentration of about 1 weight percent to about 6 weight percent. Example concentrations include about 1 weight percent, about 2 weight percent, about 3 weight percent, about 4 weight percent, about 5 weight percent, about 6 weight percent, and ranges between any two of these values. A concentration of about 3 weight percent to about 5 weight percent is presently preferred. The per-acid can generally be any per-acid. Examples of per-acids include peracetic acid, performic acid, perpropanoic acid, and perbutanoic acid. It is presently preferred that the per-acid be peroxyacetic acid (ethaneperoxoic acid; peroxyacetic acid; $CH_3CO_3H$). The per-acid can generally be present in the composition at a concentration of about 1 weight percent to about 15 weight percent, with a concentration of about 3 weight percent to about 10 weight percent being presently preferred. Examples of concentrations include about 1 weight percent, about 2 weight percent, about 3 weight percent, about 4 weight percent, about 5 weight percent, about 6 weight percent, about 7 weight percent, about 8 weight percent, about 9 weight percent, about 10 weight percent, about 11 weight percent, about 12 weight percent, about 13 weight percent, about 14 weight percent, about 15 weight percent, and ranges between any two of these values. The compositions can comprise both hydrogen peroxide and a per-acid, or hydrogen peroxide and an organic acid (such as acetic acid, formic acid, propanoic acid, or butanoic acid).

The composition can further comprise accelerants or inhibitors to modify the rate of reaction with polymer deposits or calcium carbonate. Accelerants increase the rate of decomposition of peroxides. Examples of accelerants include peroxidase enzymes, and transition metal compounds (e.g. compounds of manganese, iron, copper, etc.). Accelerants can generally be present in the composition at a concentration of about 1–2 ppm to about 1–2 weight percent. Inhibitors decrease the rate of decomposition of peroxides. Examples of inhibitors include phosphate salts and phosphonate salts. Inhibitors can generally be present in the composition at a concentration of about 1–2 ppm to about 5 weight percent.

Methods of Use

The above described compositions are useful for treating oil and/or gas wells suspected of containing polymer deposits and/or calcium carbonate. Useful compositions include those comprising water, a buffer, and hydrogen peroxide and/or a per-acid. Alternatively, the methods can involve the use of a composition comprising water and hydrogen peroxide.

The methods can comprise selecting an oil and/or gas well, and pumping one of the above described compositions into the well. The compositions are contacted with the well for a period of time sufficient to reduce or eliminate any polymer deposits and/or calcium carbonate. The methods can further comprise removing the compositions after the contacting period. The well is preferably treated with the compositions are in a single step.

The pumping can be performed in a single pumping event, multiple pumping events, or as a continuous pumping process. The well can be "closed in", allowing the compositions to contact the well for a period of time during which additional pumping or drilling is not performed.

The following examples are included to demonstrate preferred embodiments of the invention. If not otherwise indicated, percentages are weight percentages. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Filter Cake Removal Using Magnetic Funnel (Method A)

This analytic method was performed as follows. A magnetic funnel was mounted on an Erlenmeyer flask. A high permeability sand pack (k>10 D) was placed in the funnel and compacted. A brine solution was poured and the flow rate (by gravity) through the sand pack was measured. The mud was poured and vacuum was applied for 1 hour to form the mud cake. Any excess mud was removed. Brine was again poured to determine that no flow was achieved through the mud damaged sand pack by gravity and with vacuum applied. The permeability is essentially zeroed at this point. The treatment solution (warmed to 150° F. (66° C.) prior to use) was poured onto the sand pack. The vacuum was applied for about one minute to allow the treatment solution to absorb onto the cake. The sand pack was left to soak with the solution without vacuum and allowed to react with the mud cake for 1 hour. After the incubation period, the condition of the filter cake after the reaction was observed. Presence of any residual starch (for mud containing starch as viscosifying agent) in the sand pack was tested by the iodine spot test. The vacuum was applied to allow any remaining treatment solution to flow through the sand pack. A brine solution was again flowed (without vacuum) to determine the regain permeability.

Example 2

Filter Cake Removal Test Using a Fluid Loss Cell (Method B)

This analytic method was performed as follows. A fluid loss cell was fitted with an 80 US Mesh screen, and 100 g of 70–140 Mesh sand was placed on top of it. Water or brine solution (100 ml) was poured onto the sand and shut in to heat to 150° F. (66° C.) in about 20 minutes. Pressure was applied to the cell and the time to flow 100 ml of water/brine was noted. (In each case, the fluid passes straight through and could not be measured). The cell was drained leaving the sand saturated. The mud was conditioned to 150° F. (66° C.) in the atmospheric consistometer in 20 minutes before pouring into the pre-heated cell. Pressure was then applied to the cell. The bottom valve was opened and the fluid loss recorded. Excess mud was removed while taking care not to disturb the filter cake and sand pack. The treatment was poured in and shut in for test period. After the shut in period, the bottom valve was opened and the flow measured. An iodine spot test was carried out on mud containing starch. The treatment solution was poured off and the flow measured.

Example 3

Evaluation of High Salt Drill-In Fluid

A formulation was prepared using the following components.

| Component | Concentration |
|---|---|
| Saturated NaCl brine | 311.5 ml |
| Thixsal-Plus viscosifier (TBC-Brinadd; Houston, TX) | 4 g |
| FL-7 Plus fluid loss control additive (TBC-Brinadd; Houston, TX) | 3 g |
| pH Buffer | 3 g |
| Watesal-A viscosifier (Kota Chemicals & Minerals; Petaling Jaya, Malaysia) | 46 g |
| Inhibisal polyglycol stabilizer (TBC-Brinadd; Houston, TX) | 17.5 ml |
| Defoam-2 defoamer (TBC-Brinadd; Houston, TX) | As required |

A variety of mud removal systems were assayed with Method A (Example 1) and/or Method B (Example 2). The percent regained permeability is shown in the following table (ND=not determined), along with relevant comments. Enzyme S is an amylase enzyme commercially available from BJ Services Company (Houston, Tex.).

| Mud removal system | Method | % regained permeability | Comments |
|---|---|---|---|
| 2% KCl<br>1% Enzyme S 280L | A | 29 | Positive starch test. |
| 2% KCl<br>1% Enzyme S 280L<br>0.5% Acetic acid<br>0.5% Sodium acetate | A | 88 | SKIN DAMAGE. The permeability decreases with time. Eight hours after the enzyme reaction, the regain is zero. |
| 2% KCl<br>1% Enzyme S 280L<br>0.5% Acetic acid<br>0.5% Sodium acetate | B | ND | Cake still present. Starch test positive. Fluid passes straight through before damage and after treatment. |
| 2% KCl<br>1% Enzyme S 120L<br>0.5% Acetic acid<br>0.5% Sodium acetate | A | 90 | Some residual cake remained. Starch test positive. |
| 1% Enzyme S 120L<br>1% $H_2O_2$<br>0.5% Acetic acid<br>0.5% Sodium acetate | B | ND | No cake left after treatment. Fluid passes straight through before damage and after treatment. |
| 2% KCl<br>1% enzyme S 120L<br>0.5% Acetic acid<br>0.5% Sodium acetate<br>1% $H_2O_2$ | A | 100 | All cake removed. Starch test negative. |
| 2% KCl<br>2.3% Enzyme S 120L<br>0.5% Acetic acid<br>0.5% Sodium acetate | B | ND | A thin skin of mud left. Starch test positive. Fluid passes straight through before damage and after treatment. |
| 2% KCl<br>0.3% Enzyme S 280L<br>0.5% Acetic acid<br>0.5% Sodium acetate | A | 93 | SKIN DAMAGE. The permeability decreased with time. Eight hours after the enzyme reaction, the regain is zero. |
| 3% $H_2O_2$ | A | 100 | Very fast reaction. Within 45 minutes, no cake was observed. |
| 3% $H_2O_2$ | B | ND | All cake was removed. Negative starch test. Fluid passes straight through before damage and after treatment. |
| 5% HCl | A | 12.5 | Most of the cake still remained unreacted. |
| Oxiclean oxidizing and sequestering agents (BJ Services Company; Houston, TX) | A | 100 | After 2 hours of contact between mud and Oxiclean system, no reaction was observed. After leaving to react overnight, the mud cake was completely dissolved. |
| Saturated NaCl<br>4.5% Sulfamic acid<br>1.5% Citric acid | A | 0 | Cake remained intact after reaction. |
| Saturated NaCl<br>4.5% Sulfamic acid<br>1.5% Citric acid | B | ND | Major portion of filter cake remained after reaction. Large worm hole in the middle of the cake. Starch test positive. |

Example 4

Evaluation of KCl Xanthan/Starch Mud

A formulation was prepared using the following components.

| Component | Concentration |
|---|---|
| Potassium chloride | 7–8% |
| Soda ash | 0.5 ppb |
| Caustic soda | 1.0 ppb |
| PAC-R fluid loss agent (SA Mud Services Pty; Johannesburg, South Africa) | 1.0 ppb |
| XCD xanthan biopolymer (Kelco Oil Field Group; Houston, TX) | 0.5 ppb |
| Starch | 2.0 ppb |
| PAC-UL fluid loss agent (SA Mud Services Pty; Johannesburg, South Africa) | 1.5 ppb |
| PHPA (Excess) | 1.5 ppb |
| Glycol | 3–5% |
| Calcium carbonate | As required for density |

A variety of mud removal systems were assayed with Method A (Example 1) and/or Method B (Example 2). The percent regained permeability is shown in the following table, along with relevant comments. Enzyme C is a cellulose-specific enzyme breaker commercially available from BJ Services Company (Houston, Tex.).

| Mud removal system | Method | % regained permeability | Comments |
|---|---|---|---|
| 1% Sodium acetate<br>1% Enzyme S 280L | A | 0 | Cake remained intact after reaction. |
| 1% Sodium acetate<br>1.5% Acetate acid<br>1% Enzyme S 280L | A | 0 | Cake remained intact after reaction. |

-continued

| Mud removal system | Method | % regained permeability | Comments |
|---|---|---|---|
| 1% Sodium acetate 1% Enzyme S 280L 1% Enzyme C | A | 0 | Cake remained intact after reaction. |
| 1% Enzyme S 280L 1% Enzyme C | A | 0 | Cake remained intact after reaction. |
| 1% Enzyme S 280L 1% Enzyme C 0.1% NaOCl 12% | A | 0 | Cake remained intact after reaction. |
| 1% Enzyme S 280L 1% Enzyme C 1% Enzyme GBW-12 | A | 0 | Cake remained intact after reaction. |
| 1% Hemicellulase 1 2% KCl | A | 0 | Cake remained intact after reaction. |
| Hemicellulase powder | A | 30 | The enzyme was laid on the cake for 1 hour, then 2% KCl at 150° F. (66° C.) was added and left to react for 2.5 hours. |
| 3% $H_2O_2$ | A | 86 | The cake was disintegrated. |
| Oxiclean | A | 89 | Large holes breaking through the cake could be observed. |

Example 5

Evaluation of Fresh Water PHPA Mud

A field sample of mud was obtained containing bentonite, barite, cypan, caustic potash, soda ash, starch, XCD xanthan polymer, PHPA, sodium bicarbonate, and potassium chloride.

A variety of mud removal systems were assayed with Method A (Example 1) and/or Method B (Example 2). The percent regained permeability is shown in the following table (ND=not determined), along with relevant comments.

| Mud removal system | Method | % regained permeability | Comments |
|---|---|---|---|
| 2% KCl 1% Enzyme S 280L | A | 0 | Cake remained intact after reaction. |
| Hemicellulase powder | A | 0 | The enzyme was laid on the cake for 1 hour, then 2% KCl at 150° F. (66° C.) was added and left reacting for 2.5 hours. No flow was achieved. |
| 2% KCl 0.5% Sodium acetate 0.5% Acetic acid 1% Enzyme S 280L | A | 0 | Cake remained intact after reaction. |
| 2% KCl 0.5% Sodium acetate 0.5% Acetic acid 1% Enzyme S 280L | B | ND | Cake remained intact after reaction. Fluid passes straight through before damage. After treatment, sand pack was severely damaged with only 2 ml passing through within 30 minutes. |

-continued

| Mud removal system | Method | % regained permeability | Comments |
|---|---|---|---|
| 3% $H_2O_2$ | A | 100 | Complete removal of filter cake. |
| 3% $H_2O_2$ | B | ND | Complete removal of filter cake. Fluid passes straight through before damage and after treatment. |
| Hyderase 15 3% $H_2O_2$ | A | 100% | Complete removal of mud cake. |
| Oxiclean | B | ND | All cake was removed. Fluid passes straight through before damage and after treatment. |
| Saturated NaCl 4.5% Sulfamic acid 1.5% Citric acid | B | ND | Major portion of filter cake remained after reaction. Fluid passes straight through before damage and took 9 minutes to flow through after treatment. |
| 10% Ethaneperoxoic acid | A | 0 | Cake remained intact after reaction. |
| 10% Ethaneperoxoic acid 1% Sodium acetate | A | 100 | Complete removal of filter cake. |

Example 6

Evaluation of PHPA Mud

A mud sample was obtained containing PHPA, starch, xanthan, and sized calcium carbonate. A variety of mud removal systems were assayed using Method A (Example 1) and/or Method B (Example 2). The percent regained permeability is shown in the following table (ND=not determined), along with relevant comments.

| Mud removal system | Method | % regained permeability | Comments |
|---|---|---|---|
| 2% KCl 0.5% Sodium acetate 0.5% Acetate acid 1% Enzyme S 280L | B | ND | Fluid passes straight through before damage and after treatment. Some residual cake remained but starch test is negative. |
| 1% Sodium acetate 1.5% Acetic acid 1% Enzyme S 280L | A | 100 | Complete removal of filter cake. |
| 3% $H_2O_2$ | B | ND | Complete removal of filter cake. Fluid passes straight through before damage and after treatment. |
| Saturated NaCl 4.5% Sulfamic acid 1.5% Citric acid | B | ND | Major portion of filter cake remained after reaction. Positive starch test. Fluid passes straight through before damage and after treatment. |

Example 7

Corrosion Tests Performed on Chrome 13 and Super Chrome 13

Chrome 13 and Super Chrome 13 metals can be obtained from Savik Super-Chrome Inc. (Three Rivers, West Quebec, Canada). Metal corrosion tests were performed at 4000 psi (281 kg/cm$^2$), with a contact time of 8 hours at room temperature. Test results were determined at 130° C., 150° C., and 170° C. as follows. Three acid systems were used, where LPCM=liters per cubic meter, and KPCM=kilograms per cubic meter. Ferrotrol chelating/reducing agent, D4 GB, CI-27 acid inhibitor, and HY-Temp corrosion inhibitor products are commercially available from BJ Services Company (Houston, Tex.).

(1) 15% Acetic acid+2 LPCM D4GB+6 KPCM Ferrotrol 300+3 KPCM Ferrotrol 210.

(2) Peroxyacetic system 2 (1.5% H$_2$O$_2$ with 10% acetic buffered to pH 4)+6 KPCM of Ferrotrol 300+3 KPCM of Ferrotrol 1000.

(3) Peroxyacetic system 3 (1.5% H$_2$O$_2$ with 15% acetic buffered to pH 4)+6 KPCM of Ferrotrol 300+KPCM of Ferrotrol 100.

| Test | Acid | Inhibitor at LPCM | Intensifier at KPCM | Weight loss lb/ft$^2$ | Pitting |
|---|---|---|---|---|---|
| Test results at 130° C. with Chrome 13 | | | | | |
| 1 | 1 | CI-27 @ 10 | NONE | 0.0175 | 0 |
| 2 | 1 | CI-27 @ 5 | HY-Temp I @ 1.2 | 0.0098 | 0 |
| 3 | 1 | CI-27 @ 10 | HY-Temp I @ 1.2 | 0.0055 | 0 |
| 4 | 1 | CI-27 @ 5 | HY-Temp I @ 2.4 | 0.0069 | 0 |
| 5 | 1 | CI-27 @ 10 | HY-Temp I @ 2.4 | 0.0064 | 0 |
| 6 | 2 | CI-27 @ 5 | NONE | 0.0048 | 0 |
| 7 | 2 | CI-27 @ 7 | NONE | 0.0059 | 0 |
| 8 | 2 | CI-27 @ 10 | NONE | 0.0081 | 0 |
| 9 | 2 | CI-27 @ 5 | HY-Temp I @ 1.2 | 0.0058 | 0 |
| 10 | 2 | CI-27 @ 7 | HY-Temp I @ 1.2 | 0.0037 | 0 |
| 11 | 3 | CI-27 @ 5 | NONE | 0.0129 | 0 |
| 12 | 3 | CI-27 @ 7 | NONE | 0.0143 | 0 |
| 13 | 3 | CI-27 @ 10 | NONE | 0.0189 | 0 |
| 14 | 3 | CI-27 @ 5 | HY-Temp I @ 1.2 | 0.0283 | 0 |
| 15 | 3 | CI-27 @ 7 | HY-Temp I @ 1.2 | 0.0097 | 0 |
| Test results at 150° C. with Chrome 13 | | | | | |
| 16 | 1 | CI-27 @ 8 | NONE | 0.0233 | 0 |
| 17 | 1 | CI-27 @ 10 | NONE | 0.0228 | 0 |
| 18 | 1 | CI-27 @ 5 | HY-Temp I @ 1.2 | 0.0105 | 0 |
| 19 | 1 | CI-27 @ 10 | HY-Temp I @ 1.2 | 0.0072 | 0 |
| 20 | 2 | CI-27 @ 8 | NONE | 0.0053 | 0 |
| 21 | 2 | CI-27 @ 10 | NONE | 0.0058 | 0 |
| 22 | 2 | CI-27 @ 5 | HY-Temp I @ 1.2 | 0.0036 | 0 |
| 23 | 2 | CI-27 @ 10 | HY-Temp I @ 1.2 | 0.0037 | 0 |
| 24 | 3 | CI-27 @ 8 | NONE | 0.0183 | 0 |
| 25 | 3 | CI-27 @ 10 | NONE | 0.0062 | 0 |
| 26 | 3 | CI-27 @ 5 | HY-Temp I @ 1.2 | 0.0034 | 0 |
| 27 | 3 | CI-27 @ 10 | HY-Temp I @ 1.2 | 0.0036 | 0 |
| Test results at 170° C. with Super Chrome 13 | | | | | |
| 28 | 1 | CI-27 @ 8 | NONE | 0.0299 | 0 |
| 29 | 1 | CI-27 @ 10 | NONE | 0.0219 | 0 |
| 30 | 1 | CI-27 @ 15 | NONE | 0.0193 | 0 |
| 31 | 1 | CI-27 @ 20 | NONE | 0.0237 | 0 |
| 32 | 1 | CI-27 @ 20 | HY-Temp I @ 2.4 | 0.0114 | 0 |
| 33 | 1 | CI-27 @ 10 | HY-Temp I @ 1.2 | 0.0190 | 0 |
| 34 | 2 | CI-27 @ 8 | NONE | 0.0085 | 0 |
| 35 | 2 | CI-27 @ 10 | NONE | 0.0096 | 0 |
| 36 | 2 | CI-27 @ 15 | NONE | 0.0086 | 0 |
| 37 | 2 | CI-27 @ 10 | HY-Temp I @ 1.2 | 0.0062 | 0 |
| 38 | 3 | CI-27 @ 8 | NONE | 0.0119 | 0 |
| 39 | 3 | CI-27 @ 10 | NONE | 0.0129 | 0 |
| 40 | 3 | CI-27 @ 15 | NONE | 0.0171 | 0 |
| 41 | 3 | CI-27 @ 10 | HY-Temp I @ 1.2 | 0.0052 | 0 |
| 42 | 3 | CI-27 @ 15 | HY-Temp I @ 1.2 | 0.0062 | 0 |

The results show that corrosion of Chrome 13 and Super Chrome 13 tubing with mild pH (buffered) peroxyacetic acid systems were within acceptable limits in each case and at high temperatures. Acetic acid alone is not strongly corrosive, but in certain cases, corrosion levels were above 0.02 lb/ft$^2$ (0.1 kg/m$^2$), the maximum acceptable weight loss limit for high alloy tubing.

Example 8

Calcium Carbonate Solubility Tests

Weighted portions of calcium carbonate chips (approximately 20/40 mesh size) were placed into a known volume of each test fluid. After 6 hours at atmospheric pressure and 180–200° F. (82–93° C.), the amount of dissolved calcium carbonate was determined. Four test acid systems were assayed, where LPCM=liters per cubic meter, and KPCM=kilograms per cubic meter.

System 1: 15% Acetic acid+2 LPCM D4 GB+6 KPCM Ferrotrol 300+3 KPCM Ferrotrol 210.

System 2: Peroxyacetic system 1 (3% H$_2$O$_2$ with 3.9% acetic acid buffered to pH 4)+6 KPCM of Ferrotrol 300+3 KPCM of Ferrotrol 1000.

System 3: Peroxyacetic system 2 (1.5% H$_2$O$_2$ with 10% acetic acid buffered to pH 4)+6 KPCM of Ferrotrol 300+3 KPCM of Ferrotrol 1000.

System 4: Peroxyacetic system 3 (1.5% H$_2$O$_2$ with 15% acetic acid buffered to pH of 4)+6 KPCM of Ferrotrol 300+KPCM of Ferrotrol 100.

| Calcium carbonate solubility | | | |
|---|---|---|---|
| Acid | Solubility (g/l) | Solubility (lb/gal) | Solubility (kg/m$^3$) |
| 1 | 80 | 0.67 | 80.5 |
| 2 | 15 | 0.13 | 15.6 |
| 3 | 68 | 0.57 | 68.5 |
| 4 | 107 | 0.89 | 106.9 |

These resluts show that the peroxyacetic acid system containing 15% acetic acid and 1.5% hydrogen peroxide (buffered to pH 4) (test acid #4) dissolved significantly more calcium carbonate than the other systems, including 15% acid alone (test acid #1).

Example 9

Test Method to Assay Ability of Mudzyme Systems to Remove Drill in Fluid

The following test procedure was used.

1. Mount the berea core or aloxite disk into the bottom of the HTHP fluid loss cell and close the bottom of the cell. Note an alternative to this is to build a +/−0.25 inch (0.635 cm) silica sand bed as the base to the drilling mud cake upon.
2. Pour 100 ml of filtered 2% KCl brine into the cell. Close the top of the cell and attach the nitrogen manifold. Set the pressure to 20 psi (1.4 kg/cm$^2$).
3. Open the top valve of the cell and apply 20 psi (1.4 kg/cm$^2$) of nitrogen pressure to the cell.
4. Open the bottom valve and record the time taken to collect 100 ml of brine in a graduated beaker (i.e. when nitrogen break through occurs) (Q1).
5. Shut off the nitrogen, remove the nitrogen manifold, and open the top of cell.
6. Close the bottom valve and pour 100 ml of the fluid containing the polymer (drilling mud) into the cell.
7. Close the top of the cell and attach the nitrogen manifold. Set the nitrogen pressure to 20 psi (1.4 kg/cm$^2$).
8. open the top valve of the cell and apply 20 psi (1.4 kg/cm$^2$) of nitrogen pressure to the cell.
9. Heat the cell to the required bottom hole temperature.
10. After shut in at bottom hole temperature for 30 minutes open the bottom valve and conduct a fluid loss test recording the volume of filtrate collected at 1, 4, 9, 16, 25, and 36 minutes (Q2). Close the bottom valve of the cell.
11. Release the pressure from the top of the cell and remove the nitrogen manifold. Cool the cell to room temperature and open the top of the cell.
12. Extract any liquid remaining in the cell, leaving the filter cake intact.
13. Add 100 ml of 2% KCl fluid to the cell.
14. Close the top of the cell and attach the nitrogen manifold. Set nitrogen pressure to 20 psi (1.4 kg/cm$^2$).
15. Open the top valve of the cell and apply 20 psi (1.4 kg/cm$^2$) of nitrogen pressure to the cell.
16. Open the bottom valve and record the time taken to collect 100 ml of brine in a graduated beaker (Q3).
17. Shut off the nitrogen, remove the nitrogen manifold, and open the top of cell. Extract any liquid remaining in the cell.
18. Add 100 ml treating fluid containing the desired enzyme and others additives to the cell.
19. Close the top of the cell and attach the nitrogen manifold. Set nitrogen pressure to 20 psi (1.4 kg/cm$^2$).
20. Open the top valve of the cell and apply 20 psi (1.4 kg/cm$^2$) of nitrogen pressure to the cell.
21. Heat the cell to 200° F. (93° C.) and allow the fluid to soak at this temperature for 12 hours.
22. Release the pressure from the top of the cell and remove the nitrogen manifold. Cool the cell to room temperature and open the top of the cell. Extract the remaining fluid from the cell.
23. Visually examine the disc for presence of filter cake. Where applicable, perform the iodine spot test for presence of starch.
24. Add 100 ml of 7.5% hydrochloric acid to the cell. Close the top of the cell and attach the nitrogen manifold. Set nitrogen pressure to 20 psi (1.4 kg/cm$^2$).
25. Heat the cell to 200° F. (93° C.) and allow the fluid to soak at this temperature for 30 minutes.
26. Release the pressure from the top of the cell and remove the nitrogen manifold. Cool the cell to room temperature and open the top of the cell. Extract the remaining fluid from the cell.
27. Add 100 ml of 2% potassium chloride fluid to the cell. Close the top of the cell and attach the nitrogen manifold. Set nitrogen pressure to 20 psi (1.4 kg/cm$^2$). Open the top valve of the cell and apply 20 psi (1.4 kg/cm$^2$) of nitrogen pressure to the cell.
28. Open the bottom valve and record the time taken to collect 100 ml of brine in a graduated beaker (i.e. when nitrogen break through occurs) (Q4).
29. Shut off the nitrogen, remove the nitrogen manifold, dismantle/clean the cell, and prepared for further testing.

Regarding step 23, the presence of starch is indicated by the formation of a blue color being produced when one drop of dilute iodine solution is placed on the surface of a filter cake. The absence of a blue color indicates that all starch has been degraded. The iodine spot test can only be used to detect the presence of starch. If starch is not present in the fluid used to form the filter cake, this test will be valid.

The following mud system was used:

| Component | Concentration |
| --- | --- |
| 2% KCl | 7 ppb |
| Caustic potash | 0.25 ppb |
| PAC-L/CMC low (Cellulose) | 4–6 ppb |
| PAC-R/CMC HV (Cellulose) | 0.5–1 ppb |
| XCD xanthan biopolymer | 2–4 ppb |
| CaCO$_3$ - fine | 13 ppb |
| CaCO$_3$ - coarse | 7 ppb |
| Dextrid (starch) | 4–6 ppb |

Example 10

Mudzyme and acid test results #1

The following mudzyme formulation was used. Ferrotrol chelating/reducing agent, Inflo acid-mutual solvent, GBW enzyme breaker, CI acid inhibitor, and NE non-ionic surfactant products are commercially available from BJ Services Company (Houston, Tex.). Gpt stands for gallons per thousand gallons (liters per thousand liters).

| Component | Concentration |
| --- | --- |
| Filtered water | 758 gpt |
| Potassium chloride | 167 ppt |
| Ferrotrol-210 | 20 ppt |
| Inflo-100 | 2 gpt |
| Inflo-40 | 100 gpt |
| GBW-16C | 10 gpt |
| GBW-26C | 10 gpt |
| H$_2$O$_2$ (6%) | 120 gpt |
| The following 7.5% hydrochloric acid formulation was used. | |
| Fresh water | 722 gpt |
| CI-25 | 6 gpt |
| NE-18 | 5 gpt |
| Claytrol (Baker Hughes; Houston, TX) | 3 gpt |

-continued

| | |
|---|---|
| Fe-210 | 30 ppt |
| Inflo-40 | 50 gpt |
| Inflo-100 | 5 gpt |
| 32% hydrochloric acid | 209 gpt |

The following test results were obtained following the method of Example 9.

| Measurement | Value |
|---|---|
| 2% KCl initial flow (Q1) | 5.56 cc/sec |
| Mud flow (Q2) | 0.003 cc/sec |
| 2% KCl flow after mud (Q3) | 0 cc/sec |
| 2% KCl flow after Mudzyme and acid (Q4) | 4.55 cc/sec |
| Return permeability (Q4/Q1) × 100% | 81.8% |
| pH Mudzyme solution before treatment | 4 |
| pH Mudzyme solution after treatment | 4.5 |

Example 11

Mudzyme and acid test results #2

The following mudzyme formulation was used.

| Component | Concentration |
|---|---|
| Filtered water | 858 gpt |
| Potassium chloride | 167 gpt |
| Ferrotrol-210 | 20 gpt |
| Inflo-100 | 2 gpt |
| Inflo-40 | 100 gpt |
| GBW-16C | 10 gpt |
| GBW-26C | 10 gpt |
| GBW-5 | 30 ppt |
| GBW-7 | 30 ppt |

The following 7.5 hydrochloric acid formulation was used.

| | |
|---|---|
| Fresh water | 722 gpt |
| CI-25 | 6 gpt |
| NE-18 | 5 gpt |
| Claytrol | 3 gpt |
| Fe-210 | 30 gpt |
| Inflo-40 | 50 gpt |
| Inflo-100 | 5 gpt |
| 32% HCl | 209 gpt |

The following test results were obtained following the method of Example 9.

| Measurement | Value |
|---|---|
| 2% KCl initial flow (Q1) | 6.67 cc/sec |
| Mud flow (Q2) | 0.007 cc/sec |
| 2% KCl flow after mud (Q3) | 0 cc/sec |
| 2% KCl flow after Mudzyme and acid (Q4) | 1.06 cc/sec |
| Return permeability (Q4/Q1) × 100% | 15.9% |
| pH Mudzyme solution before treatment | 3.5 |
| pH Mudzyme solution after treatment | 3.5 |

Example 12

Wellbore filter cake removal test using HTHP cell the following test procedure was used.

1. The Aloxite or berea disc was loaded into the cell.
2. The cell was filled with filtered brine, 2% KCl.
3. Pressure was applied and the cell allowed to come to temperature.
4. The bottom valve was opened and the time taken for 200 ml to pass through the disc at 100 psi (689 KPa) was recorded.
5. The pressure was bled from the cell slowly excess brine removed.
6. The cell was filled with the mud fluid.
7. The pressure was applied and the cell allowed to come to temperature.
8. After reaching temperature, open the bottom valve and record fluid loss at 1", 4", 9", 16", 25" and 30". Close the bottom valve of the cell.
9. The cell was shut-in until the desired time.
10. After the required shut-in time, excess mud was from the cell leaving the filter-cake intact.
11. The desired breaker fluid was added to the cell.
12. The pressure was applied, the cell allowed to come to temperature and the system was shut-in for four hours.
13. After the four hours shut-in period, the pressure was bled from the cell, and the treatment fluid extracted.
14. The disc was removed and examined for the presence of filter-cake. Iodine spot test was carried out for the presence of starch (presence of starch is indicated by a dark blue discoloration of the iodine). A few drops of HCl were placed onto the disc to determine the presence or absence of undissolved carbonate.
15. The disc was flipped and placed in the cell in the opposite orientation.
16. The cell was filled with filtered brine, and the time taken to flow 200 ml at 100 psi (689 KPa) was recorded.

Example 13

Evaluation of Filter Cake Removal Ability

Four mud systems were used to evaluated the ability of various formulations to remove filter-cakes, as measured by the procedure of the previous Example. Two lacked drill solids, and two were the corresponding muds containing drill solids.

| Label | Contents |
|---|---|
| A | Mud from Rig BN-3 containing drill solids. |
| B | Freshly prepared mud, no drill solids. 2% KCl, 8 ppb dextrid starch, 2.5 ppb xanthan gum, 30 ppb ground marble fine, and 0.1 ppb potassium hydroxide. |
| C | Freshly prepared mud containing drill solids. |
| D | Freshly prepared mud, no drill solids. 2% KCl, 8 ppb dextrid starch, 2.5 ppb xanthan gum, 10 ppb baracarb 5 (Haliburton; Houston, TX), 20 ppb ground marble fine, and 0.3 ppb potassium hydroxide. |

Example 14

Preparation of Breaker Fluids

Six different breaker fluids were prepared or obtained for evaluation. They were a) buffered peroxyacetic acid; b) buffered mudzyme CS (a mixture of cellulase and amylase enzymes buffered with acetic acid and sodium acetate); c) Oxiclean (a mixture of oxidizing agents; generally ammonium persulphate, sodium perborate and fumaric acid); d) 1.2% sodium hypochlorite; e) 7.5% hydrochloric acid; and f) 7.5% hydrochloric acid with added sodium perborate.

Example 15

Fluid Loss Data

Muds A–D were assayed for their cumulative fluid loss volume over time.

| Test # | Mud | Cumulative volume, ml | | | | | |
|---|---|---|---|---|---|---|---|
| | | 1' | 4' | 9' | 16' | 25' | 30' |
| 1 | A | 6 | 7 | 8 | 9 | 9.5 | 10 |
| 2 | A | 6 | 6.5 | 7.5 | 8.5 | 9.5 | 10 |
| 3 | A | 5 | 6 | 7 | 8 | 9 | 9.5 |
| 4 | A | 5 | 6.5 | 7.5 | 8.5 | 10 | 10.5 |
| 5 | A | 3 | 4 | 5 | 6 | 7 | 7 |
| 6 | A | 3.5 | 4.5 | 5.5 | 6.5 | 7 | 7.5 |
| 7 | B | 9.5 | 10.5 | 12 | 13.5 | 15 | 15.5 |
| 8 | C | 2.5 | 3 | 3.5 | 4.5 | 5.5 | 6 |
| 9 | D | 8.5 | 10 | 11.5 | 13 | 14.5 | 15 |

The breaker fluids were assayed for their ability to disolve filter cakes. First, mud A was tested using all six breaker fluids. The results were as follows, showing that the buffered peroxyacetic acid was clearly more effective than the other compositions at removing the filter cake. Note, tests 5 and 6 were performed using berea discs instead of aloxite.

| # | Breaker | Initial flow rate ml/s | Final Flow rate ml/s | % Efficiency | Filter cake | Starch | CaCO$_3$ |
|---|---|---|---|---|---|---|---|
| | (A) MUD FROM RIG BN-3 (with drill solids) | | | | | | |
| 1 | Buffered peroxyacetic acid | 14 | 25 | 178% | None | None | Traces |
| 2 | Mudzyme CS | 17 | NA | — | Yes | Yes | Yes |
| 3 | Oxiclean | 25 | NA | — | Partially | Yes | Yes |
| 4 | 1.2% NaOCl | 18 | NA | — | Partially | Yes | Yes |
| 5 | 7.5% HCl | 5 | NA | — | Yes | Yes | None |
| 6 | 7.5% HCl + sodium perborate | 3 | NA | — | Yes | Yes | Yes |

Next, muds B, C, and D were evaluated with the buffered peroxyacetic acid. The results were as follows, showing favorable results obtained by use of the buffered peroxyacetic acid compositions. Note, test 8 was performed using berea discs instead of aloxite.

| # | Breaker | Initial flow rate ml/s | Final Flow rate ml/s | % Efficiency | Filter cake | Starch | CaCO$_3$ |
|---|---|---|---|---|---|---|---|
| | (B) Freshly prepared mud, no drill solids | | | | | | |
| 7 | buffered peroxyacetic acid | 19 | 20 | 105% | None | None | Traces |
| | (C) Freshly prepared mud, with drill solids | | | | | | |
| 8 | buffered peroxyacetic acid | 2.7 | Disc cracked | — | None | None | None |
| | (D) Freshly prepared mud, no drill solids | | | | | | |
| 9 | buffered peroxyacetic acid | 14.3 | 15.4 | 108% | None | None | None |

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

The invention claimed is:

1. A method for improving the permeability of a well, the method comprising:
   selecting a well suspected of containing polymer deposits; and
   pumping a well treatment composition into the well, wherein the composition comprises water, a buffer, and hydrogen peroxide or a per-acid.

2. The method of claim 1, further comprising:
   measuring the permeability of the well prior to the pumping step; and
   measuring the permeability of the well after to the pumping step.

3. The method of claim 2, wherein the permeability of the well after to the pumping step is greater than the permeability of the well prior to the pumping step.

4. The method of claim 1, wherein the composition has a pH of about 3 to about 5.

5. The method of claim 1, wherein the buffer comprises acetic acid and an acetate salt.

6. The method of claim 5, wherein the acetate salt is sodium acetate, potassium acetate, or ammonium acetate.

7. The method of claim 1, wherein the buffer comprises formic acid and a formate salt.

8. The method of claim 7, wherein the formate salt is sodium formate, potassium formate, or ammonium formate.

9. The method of claim 1, wherein the buffer comprises citric acid and a citrate salt.

10. The method of claim 9, wherein the citrate salt is sodium citrate, potassium citrate, or ammonium citrate.

11. The method of claim 1, wherein the per-acid is peroxyacetic acid.

12. The method of claim 1, wherein the concentration of hydrogen peroxide in the composition is about 1 weight percent to about 6 weight percent.

13. The method of claim 1, wherein the concentration of per-acid in the composition is about 1 weight percent to about 15 weight percent.

14. The method of claim 1, wherein the composition further comprises a peroxidase enzyme.

15. The method of claim 1, wherein the composition further comprises a phosphate salt or a phosphonate salt.

16. The method of claim 1, wherein the composition further comprises an iron-control agent, a surface tension reducer, a dispersant, a corrosion inhibitor, or a clay stabilizer.

* * * * *

UNITED STATES PATENT AND TRADEMARK OFFICE
CERTIFICATE OF CORRECTION

| | | |
|---|---|---|
| PATENT NO. | : 7,156,178 B2 | Page 1 of 1 |
| APPLICATION NO. | : 10/605337 | |
| DATED | : January 2, 2007 | |
| INVENTOR(S) | : Philip J. Rae and Dilullo Arias | |

It is certified that error appears in the above-identified patent and that said Letters Patent is hereby corrected as shown below:

Title Page item 75

Please cancel "Phillip" and insert --Philip--.

Signed and Sealed this

First Day of May, 2007

JON W. DUDAS
*Director of the United States Patent and Trademark Office*